(12) United States Patent
Aitken et al.

(10) Patent No.: US 6,411,970 B1
(45) Date of Patent: Jun. 25, 2002

(54) METHODS AND APPARATUS FOR AN AUTOMATIC FILE INDEXER

(75) Inventors: Robert B. Aitken, Huntsville; Thomas M. Holt, Athens; Steve D. Scott, Huntsville; Mike Whitten, Madison, all of AL (US)

(73) Assignee: Intergraph Corporation, Huntsville, AL (US)

( * ) Notice: Subject to any disclaimer, the term of this patent is extended or adjusted under 35 U.S.C. 154(b) by 0 days.

(21) Appl. No.: 09/316,433

(22) Filed: May 21, 1999

Related U.S. Application Data
(60) Provisional application No. 60/086,309, filed on May 21, 1998.

(51) Int. Cl.[7] .............................................. G06F 17/30
(52) U.S. Cl. ........................... 707/205; 707/3; 709/217
(58) Field of Search ............................. 707/103–104.1, 707/1–2, 8–10, 200–205; 705/37; 709/217; 712/3; 341/51; 714/4; 717/7, 11.5

(56) References Cited

U.S. PATENT DOCUMENTS

| | | | | |
|---|---|---|---|---|
| 5,043,876 A | * | 8/1991 | Terry | 707/201 |
| 5,467,472 A | * | 11/1995 | Williams et al. | 707/1 |
| 5,537,585 A | * | 7/1996 | Blickenstaff et al. | 707/205 |
| 5,664,186 A | * | 9/1997 | Bennett et al. | 707/204 |
| 5,680,616 A | * | 10/1997 | Williams et al. | 707/103 |
| 5,748,956 A | * | 5/1998 | Lafer et al. | 707/104 |
| 5,911,776 A | * | 6/1999 | Guck | 707/217 |
| 5,931,947 A | * | 8/1999 | Burns et al. | 707/9 |
| 5,940,841 A | * | 8/1999 | Schmuck et al. | 707/205 |
| 5,974,424 A | * | 10/1999 | Schmuck et al. | 707/201 |
| 5,987,477 A | * | 11/1999 | Schmuck et al. | 707/201 |
| 5,991,753 A | * | 11/1999 | Wilde | 707/2 |

* cited by examiner

Primary Examiner—John Breene
Assistant Examiner—Mohammad Ali
(74) Attorney, Agent, or Firm—Townsend and Townsend and Crew, LLP (57) ABSTRACT

The present invention provides exemplary software and related hardware for monitoring and managing documents and document properties. One embodiment provides a computer system (40) including a processor (42), a display (44) coupled to the processor, and a computer readable storage media (46) coupled to the processor. The storage media includes code that directs the processor to retrieve a first computer file from the storage media, and code that directs the processor to examine the first computer filed to determine if a plurality of desired properties are contained therein. If all of the desired properties are not contained within the first computer file, the storage media code directs the processor to create a first shadow file which is linked to the computer file so that the shadow file may contain the missing desired properties.

23 Claims, 8 Drawing Sheets

Imagineer.igr Properties

| General | Summary | Statistics | Status | Project | Custom |

Title:

Subject:

Author: actate

Manager:

Company:

Category:

Keywords:

Comments:

Template: normal IGR

[ OK ]  [ Cancel ]  [ Apply ]  [ Help ]

| | ManagedWord7.doc Properties | |
|---|---|---|

| General | Summary | Statistics | Status | Project | Custom |

Name: [    ]  [±]  [Add]
Type: [Text]  [±]  [Delete]
Value: [    ]  ☐ Line to Content Properties:

| Name | Value | Type |
|---|---|---|
| A Text Property | abcdefg | Text |
| A Number Property | 12345 | Number |
| A Date Property | 8/20/96 | Date |
| A Yes or No Prop... | Yes | Yes or No |
| ⚭ A Linked Property | This is a Word... | Text |

[OK] [Cancel] [Apply] [Help]

*Fig. 3F*

METHODS AND APPARATUS FOR AN AUTOMATIC FILE INDEXER

CROSS-REFERENCES TO RELATED APPLICATIONS

The subject application claims priority from U.S. Provisional Patent application No. 60/086,309, filed May 21, 1998, the complete disclosure of which is incorporated herein by reference.

BACKGROUND OF THE INVENTION

The present invention relates generally to the management of computer files, and more specifically, to software and related hardware for monitoring and managing computer files.

The growing use of software, particularly in the work environment, has led to an increased interest in document management. The days have past when the only function required of the software application would be the creation and saving of document files. An increase in the number of software applications used in a typical work environment, in addition to the growing number of documents saved in a computer storage media, has led to increased document management needs. For example, it may be desirable for some software users to query the existing data base of created documents in search of a particular document, created on a certain date or by a certain user.

Unfortunately, the wide range of software applications and documents created thereby have resulted in a large number of computer file configurations. Each of these configurations may be structured differently, and may contain different types and amounts of information. For example, some non-structured files, such as text files, can only hold the text input by a user and cannot hold other desirable properties. Text files typically do not have separate fields into which can be placed information related to the document author, subject matter or key words.

Other types of documents, for example structured document files, may contain some number of properties in addition to the data/text input by the user. However, a series of documents maintained, for example on a company server, may each have a different number of properties depending upon the application used to create those documents. It would be desirable, therefore, to create software and a related hardware system to permit the standardization of document properties for each document file created by a wide range of applications.

SUMMARY OF THE INVENTION

The present invention provides exemplary software and related hardware for monitoring and managing documents and document properties.

One embodiment of the present invention provides a computer system for managing computer files. The computer system includes a processor, a display coupled to the processor, and a computer readable storage media coupled to the processor. The storage media includes code that directs the processor to retrieve a first computer file from the storage media. The storage media further includes code that directs the processor to examine the first computer file to determine if a plurality of desired properties are contained therein. If all of the desired properties are not contained within the first computer file, the code on the storage media directs the processor to create a first shadow file. The storage media further includes code that directs the processor to input a default value into the first shadow file for at least one of the desired properties that are not contained within the first computer file. Further, the computer readable storage media includes code that directs the processor to link the first shadow file with the first computer file. In this manner, the computer system creates the shadow file containing the missing desired properties not found in the first computer file, and links that shadow file with the first computer file.

In one aspect, the storage media further includes code that directs the processor to copy the first shadow file each time the first computer file is copied. In another aspect, the storage media includes code that directs the processor to display at least one of the plurality of desired properties on the display.

The present invention further provides a method for managing computer files contained on a computer system. The method includes creating a managed directory on the computer system having a plurality of computer files. The method includes examining a first computer file of the plurality of computer files to determine if a plurality of desired properties are contained within the first computer file. If the first computer file does not contain all of the desired properties, a first shadow file is created and linked with the first computer file. In this manner, the method provides for creating a shadow file so that all the desired properties are either in the first computer file or contained in the first shadow file which is linked to the first computer file.

In one aspect, the method includes inputting a default value into the first shadow file for at least one of the plurality of desired properties not contained within the first computer file. In another aspect, the method includes copying the first computer file to create a second computer file, whereby the copying step causes the first shadow file to be copied to create a second shadow file that is linked with the second computer file. In one aspect, copying the first computer file to a second managed directory also causes the first shadow file to be copied to the second managed directory so that the two copied files are linked on the second managed directory. In one aspect, the examining step is performed for each of the computer files within the managed directory, and the creating, inputting and linking steps are performed for each of the computer files that does not contain all of the desired properties.

In one embodiment, each of the computer files within the managed directory are examined, and each file that does not contain all of the plurality of desired properties is linked to the first shadow file. In this manner, the first shadow file can operate to contain properties for more than one computer file.

In one aspect, the managed directory includes a plurality of subdirectories, and the first computer file and first shadow file are in the same subdirectory. In another aspect, each subdirectory has an associated shadow file. The shadow file within a subdirectory is linked with all of the computer files in that same subdirectory that do not contain all of the desired properties.

In one aspect, the creating steps create a plurality of shadow files. In another aspect, the method further includes searching the plurality of computer files and the plurality of shadow files for a first desired property. In still another aspect, the plurality of desired properties include at least one property selected from a group of properties consisting essentially of a file title, a file subject, a file author, and a file key word. Alternatively, the plurality of desired properties include at least one property selected from a group of properties consisting essentially of a file number, a revision number and a file date. The method, in one aspect, further includes displaying at least one of the desired properties on a computer display.

The present invention further provides an article of manufacture including a computer useable medium having a computer readable program code means embodied therein for causing a computer to verify the existence of computer file properties. The computer readable program code means includes code for causing the computer to examine a first computer file to determine if the first computer file contains a plurality of desired properties. The computer readable program code means further includes code for causing the computer to create a first shadow file if the first computer file does not contain all of the desired properties, and code for causing the computer to link the first shadow file with the first computer file. In one aspect, the article of manufacture further includes code for causing the computer to input a default value into the first shadow file for at least one of the plurality of desired properties not contained in the first computer file.

In one embodiment of the present invention, a method for managing computer files contained on a computer system is provided. The method includes creating a managed directory on the computer system containing a plurality of computer files. The method further includes examining a first computer file within the plurality of computer files to determine if a plurality of desired property are contained therein. If the first computer file does not contain all of the desired properties, the method includes inputting a default value into the first computer file for at least one of the desired properties that is not contained within the first computer file.

Other features and advantages of the invention will appear from the following description in which the preferred embodiment has been set forth in detail in conjunction with the accompanying drawings.

DESCRIPTION OF THE SPECIFIC EMBODIMENTS

Figure 1:
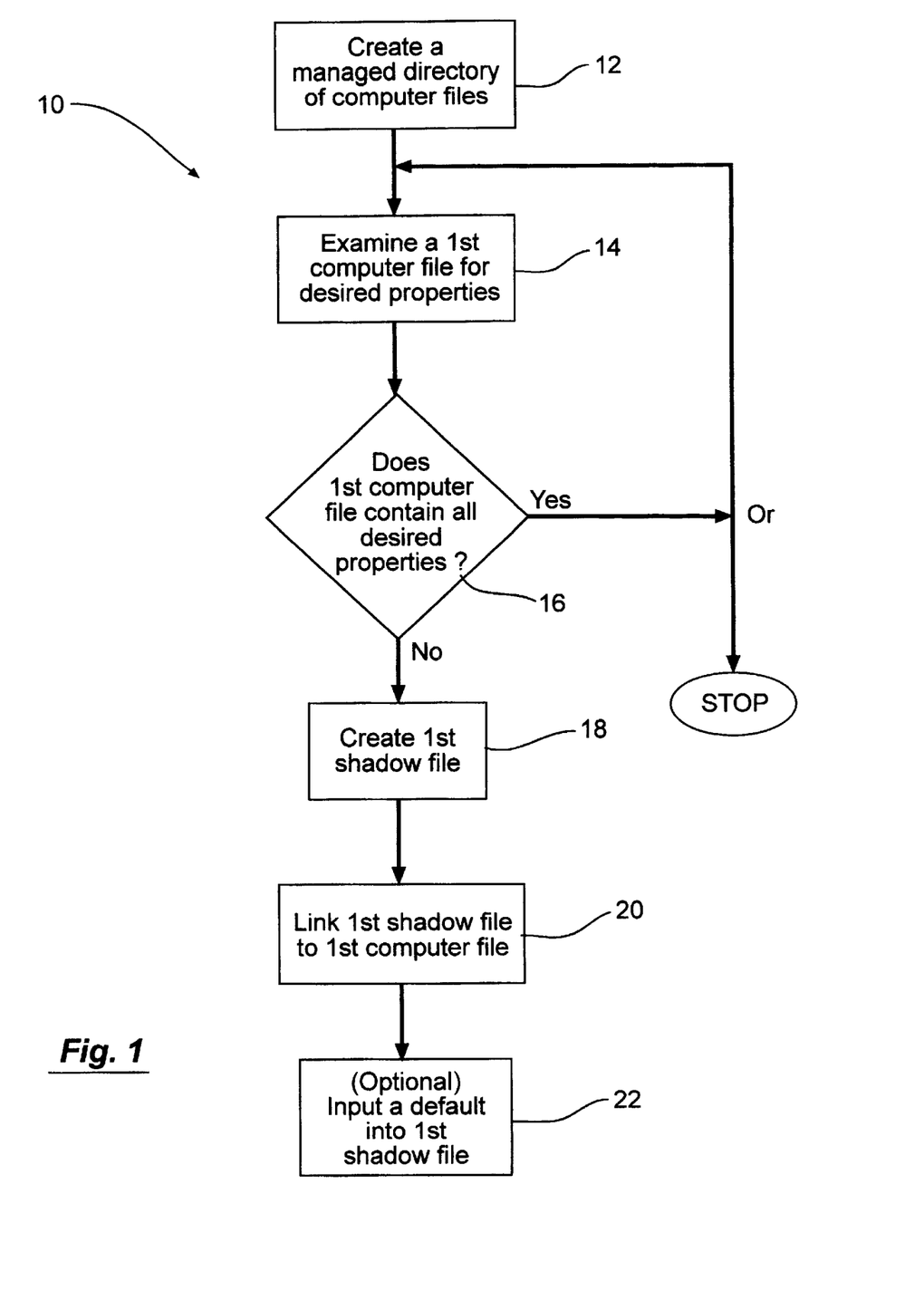
FIG. 1 depicts a schematic flow diagram of a method according to the present invention.

FIG. 1 shows a schematic flow chart of an exemplary method 10 according to the present invention. Method 10 includes the step of creating a managed directory of computer files (step 12). This managed directory of files may be located on a hard drive, removable storage media such as floppy disks, a server, a storage subsystem, other storage media and the like. The managed directory may include one or more subdirectories, with computer files contained therein. Computer files contained within the managed directory (and the underlying subdirectory(ies)) are referred to as managed files or managed documents. The method includes examining a first computer file to determine if the file contains a plurality of desired properties (step 14). As described below in further detail, each managed document is to have a desired set of properties contained either in the managed document or in a shadow file.

If the first computer file contains all the desired properties (step 16), the process is concluded. Alternatively, the examination of additional computer files to determine if they contain the desired properties may be performed. If the first computer file does not contain all of the desired properties, a first shadow file is created (step 18). The first shadow file is linked to the first computer file (step 20). In this manner, the first shadow file is used to hold the desired properties that are not contained within the first computer file. Further, by linking the shadow file with its corresponding computer file, the properties contained within the shadow file can be associated with the proper computer file.

In an optional step 22, a default value is input into the first shadow file for at least one of the desired properties not contained within the first computer file. For example, a default date may be input for a "file creation date" property. Alternatively, the first shadow file may be structured so that a user can input the desired properties into the shadow file at a later time or at the user's convenience.

In one embodiment, the system user can define the list of properties which are needed or desired for each computer file. The examining step 14 then can be tailored to search for the list of desired properties identified by the user.

In one embodiment, a shadow file is created and linked to each computer file that is examined and determined to have less than all of the desired properties. In this embodiment, a plurality of shadow files are created if a plurality of computer files do not contain all of the desired properties.

In another embodiment, each subdirectory contains a single shadow file. The shadow file in this embodiment would be linked to computer files in the same subdirectory that do not contain all of the desired properties. In this manner, the shadow file has structured fields to contain desired properties for more than one computer file. The numbers and types of desired properties contained within the shadow file for a specific computer file will depend on which of the desired properties were missing from that computer file.

As previously noted, some software applications produce structured storage files which contain not only the data input by the user (for example, words and sentences of text in a word processing document), but also contain fields to store additional information, such as file properties. Applications which create computer files containing all the desired properties stored within the computer files themselves are referred to as native documents. In one embodiment, native documents are managed documents whether they reside on a managed directory or a non-managed directory.

Some applications create computer files which contain only some of a list of desired properties. For example, Microsoft Word 7.0 documents contain summary information and document information property sets, but do not have an associated state of the documents. In other words, the document itself does not contain information regarding whether the document is in use by another user, is available for editing, and the like. Therefore, even documents which have the ability to possess property information therein may still need a shadow file into which the additional desired properties may be saved.

In one embodiment, when a managed document is moved or copied to another managed directory, for example using cut/copy and paste commands, all of the associated properties are retained. If the managed document has a shadow file linked thereto, the shadow file also is moved or copied to the other managed directory. The deletion of a managed document preferably results in the deletion of the linked shadow file. In one embodiment, when a managed document is moved or copied to a non-managed directory, only those properties that are actually contained within the document or file are retained. Further, when a managed document is renamed, all the associated property intelligence is retained. For example, the Nth shadow file remains linked to the associated Nth computer file notwithstanding the file name change. In this manner, a directory of managed computer files may be created whereby each computer file has a desired set of properties notwithstanding the fact that the files themselves may have been created by different software applications and may contain different amounts of property-related data within the files. The ability to have each computer file possess the same desired properties is carried out in one embodiment by the creation and linking of shadow files to the computer files which do not contain all of the desired properties.

As previously noted, in one embodiment a single shadow file contains desired properties for more than one managed document. This may occur, for example, when a single shadow file is associated with a subdirectory, and more than one computer file in that subdirectory does not contain all of the desired properties. In this embodiment, deleting a computer file would result in the deletion from the shadow file of the properties corresponding to that deleted computer file. In a similar fashion, moving a managed document from a first subdirectory to a second subdirectory would result in the deletion of the desired properties contained in the first subdirectory's shadow file for the moved document, and the creation of those desired properties in the second subdirectory's shadow file.

Modification to computer files under management control, including move/copy/delete actions, are tracked and reacted to by the management system. Computer file changes, regardless of the source of the changes, are tracked through a custom device driver. A device drive is an application that runs either below the operating system or as part of the operating system, and has global access to machine-level events. The device driver tracks the copy, move and delete events on the system. Events relating to a managed document pass from the device drive to the document management (DM) system software. The DM system then can take the appropriate action based on the particular event as discussed above. In one embodiment, the computer file changes are tracked and acted upon regardless of the source for the file operation. In this manner, modification of computer files and the related effects to a linked shadow file can be initiated from outside the DM system, for example, in a Windows Explorer environment.

In another embodiment, for computer files which contain some but not all of the desired properties, the additional desired properties are inserted directly into the computer file. This may occur, for example, for structured storage files which possess the ability to contain property fields within the document itself, but were created by an application software which incorporated only some of the desired properties into the computer file. In this embodiment, the desired properties would not be placed in a shadow file.

In one particular embodiment, the managed document properties include a summary information property set, a document summary information property set, an extended summary information property set and a project information property set. The summary information property set includes a file title, a file subject, a file author, file key words, and comments. The document summary information property set includes a company, a category, a manager, and custom properties. The extended summary information property set includes a status of the file, and the user name. Further, the project information summary set includes a document number, a revision number and a project name.

The above property sets represent one of a number of ways to group document properties, and represent merely an example of desired properties for use in accordance with the present invention. By way of example and not limitation, other desired properties may include total editing time, last saved by, last saved time, last printed time, creation locale, creation time, name of creating application, name of saving application, number of pages, number of words, number of characters, number of sheets, number of objects, bytes, lines, paragraphs, slides, notes, hidden slides, multi-media clips, file size, format, file size, document ID, security, discipline, material, template and thumbnail. Further, the desired properties may include custom properties created, for example, by a user of the system depicted in FIG. 2.

Figure 2:
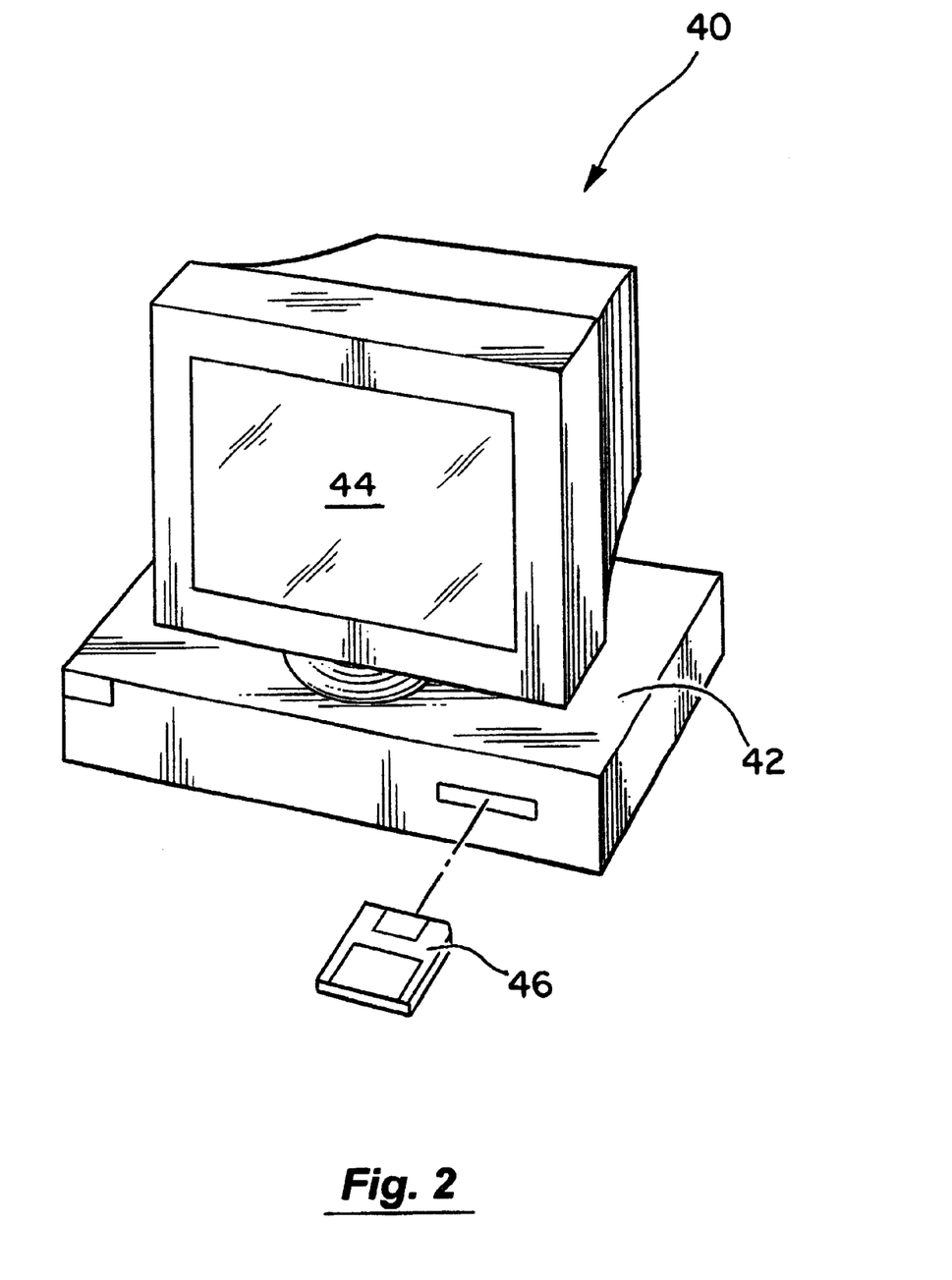
FIG. 2 depicts a simplified overview of a computer system according to the present invention.

Turning now to FIG. 2, an exemplary computer system according to the present invention will be described. Computer system 40 includes a processor 42 and a display 44. A computer readable storage media 46 is coupled to the processor. Storage media 46 contains the code which directs the processor to carry out the method described in conjunction with FIG. 1. While depicted as a removable diskette, storage media 46 may comprise a compact disk (CD), a DVD, a hard drive, a server, a storage subsystem, other storage media, and the like. Preferably, the managed document properties can be edited, revised, queried, and viewed on system 40 depicted in FIG. 2. Methods of the present invention include searching the managed directory of managed documents for documents containing a desired property value. For example, the query may search for all of a particular type of document, all documents created on a certain date, etc. Having all managed documents with a minimum number of standard desired properties facilitates coordinated searching of the documents notwithstanding the fact the documents may have been created by a variety of different applications. The search may be conducted in both the computer files and the shadow files.

FIGS. 3A–3F depict embodiments of user interfaces for displaying, editing, and searching the desired properties for a group of managed documents. It will be appreciated by those skilled in the art that FIGS. 3A–3F depict one of a large number of ways to display computer file properties and is not intended to limit the scope of the present invention. Preferably, when file properties are displayed on a computer display, it is transparent to the use whether those properties are stored in the computer file, or in the associated shadow file.

Figure 3A:
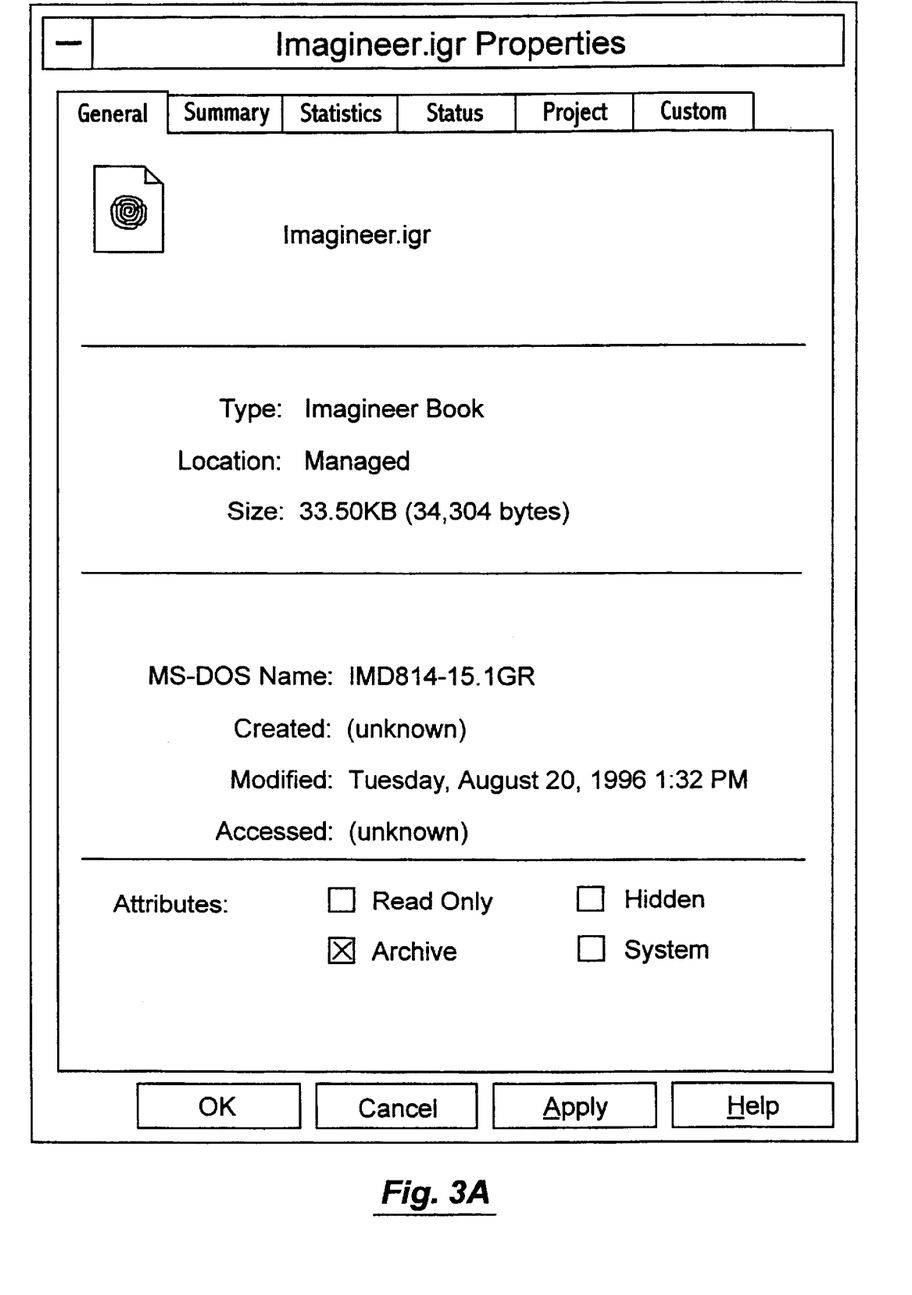
FIGS. 3(a)–3(f) depict exemplary displays of document properties according to the present invention.

For example, FIG. 3A depicts a general page displaying some desired properties of the managed document. For example, the general page depicts the type of software which created the computer file, as well as the last modification date. Typically, when a file resides on a file allocation table (FAT) file system, only the modified date is displayed. When a file resides on a new technology file system (NTFS), the created, modified and access dates are displayed.

Figure 3B:
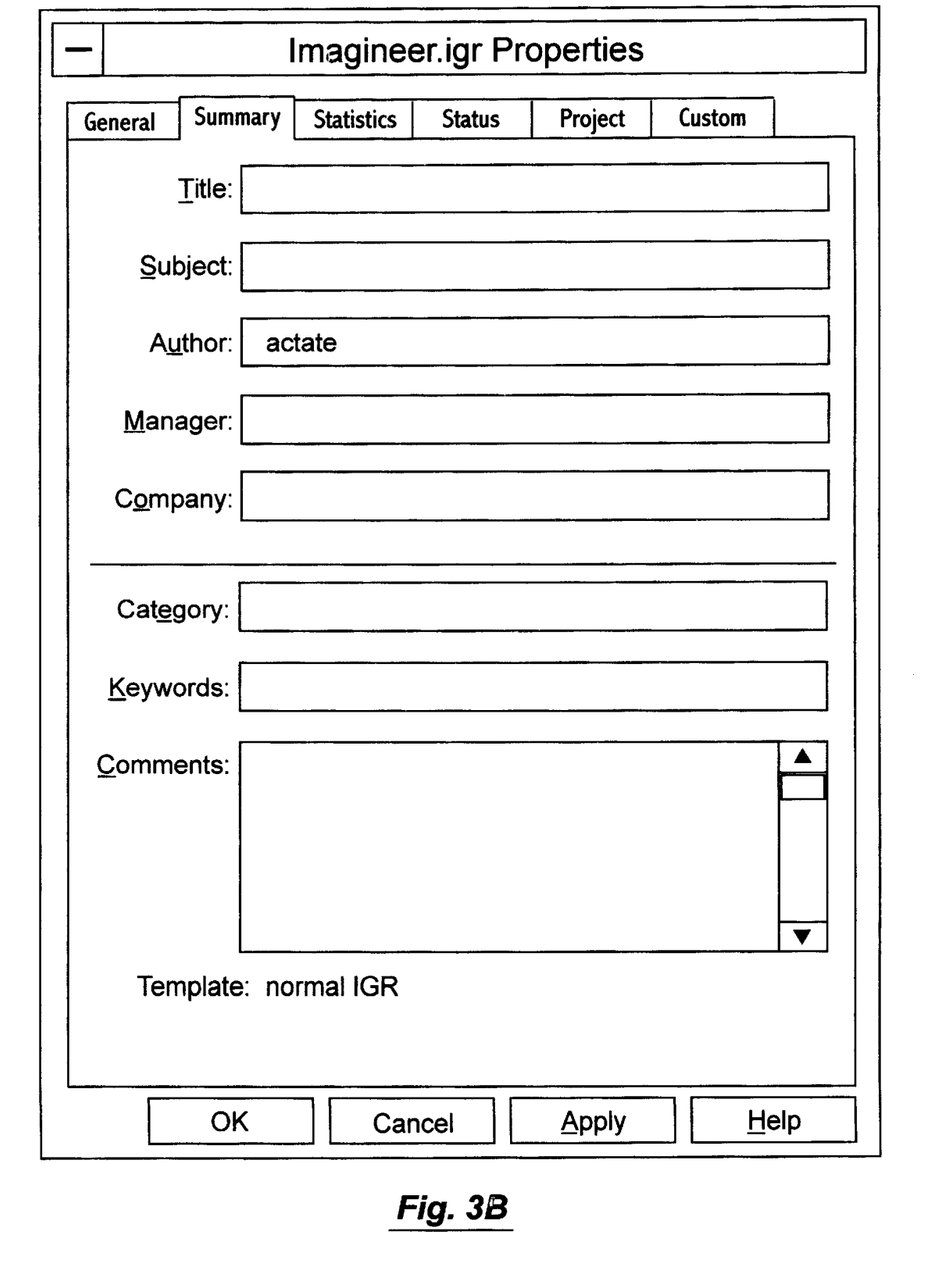

FIG. 3B depicts the title, subject, author, manager, company, category, key words and comments properties for the managed document. These properties preferably are available for editing by the user.

Figure 3C:
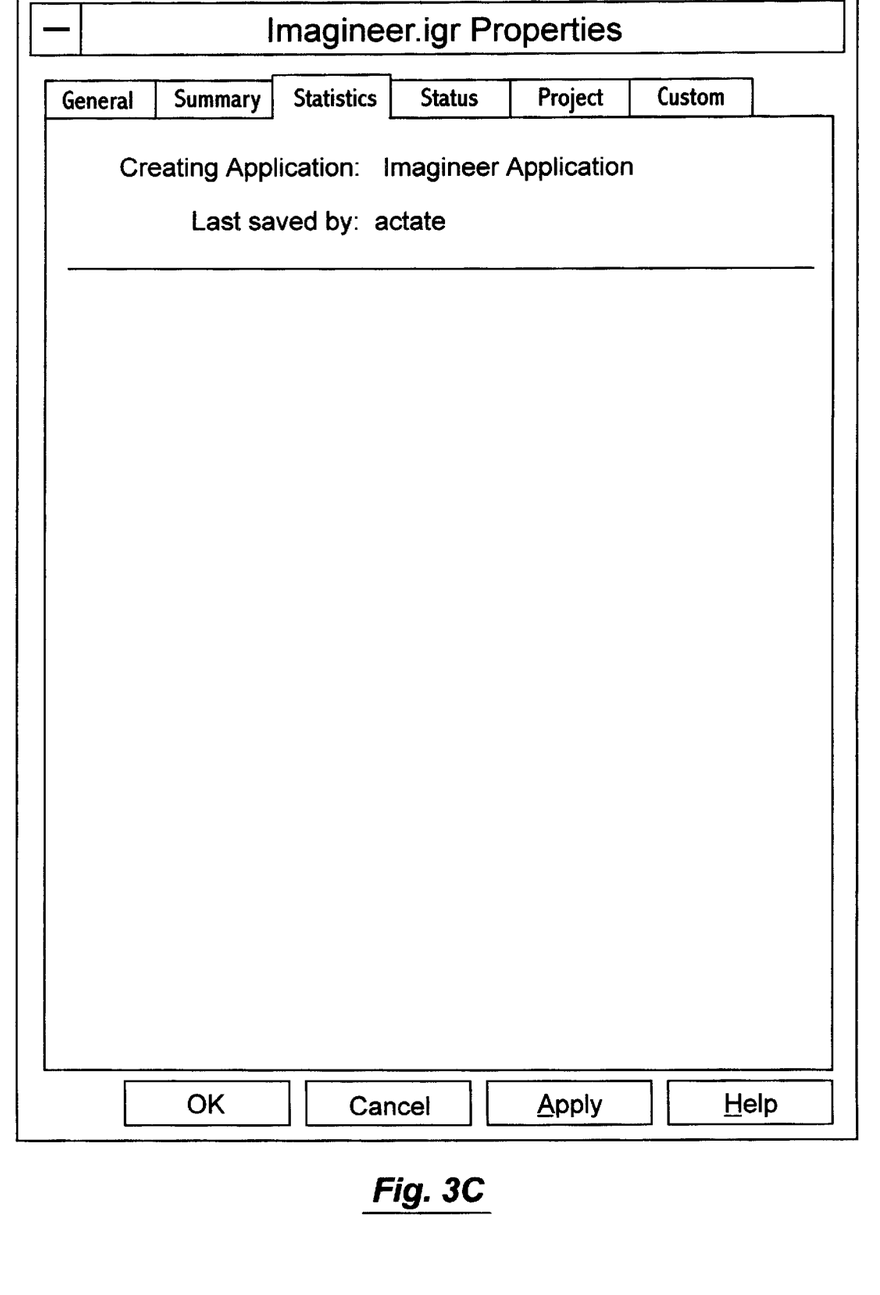

FIG. 3C depicts a statistics page for a managed document. Typically, the statistics page contains read-only statistical properties that are common to some object-linking and embedding (OLE) documents and are displayed for informational purposes.

Figure 3D:
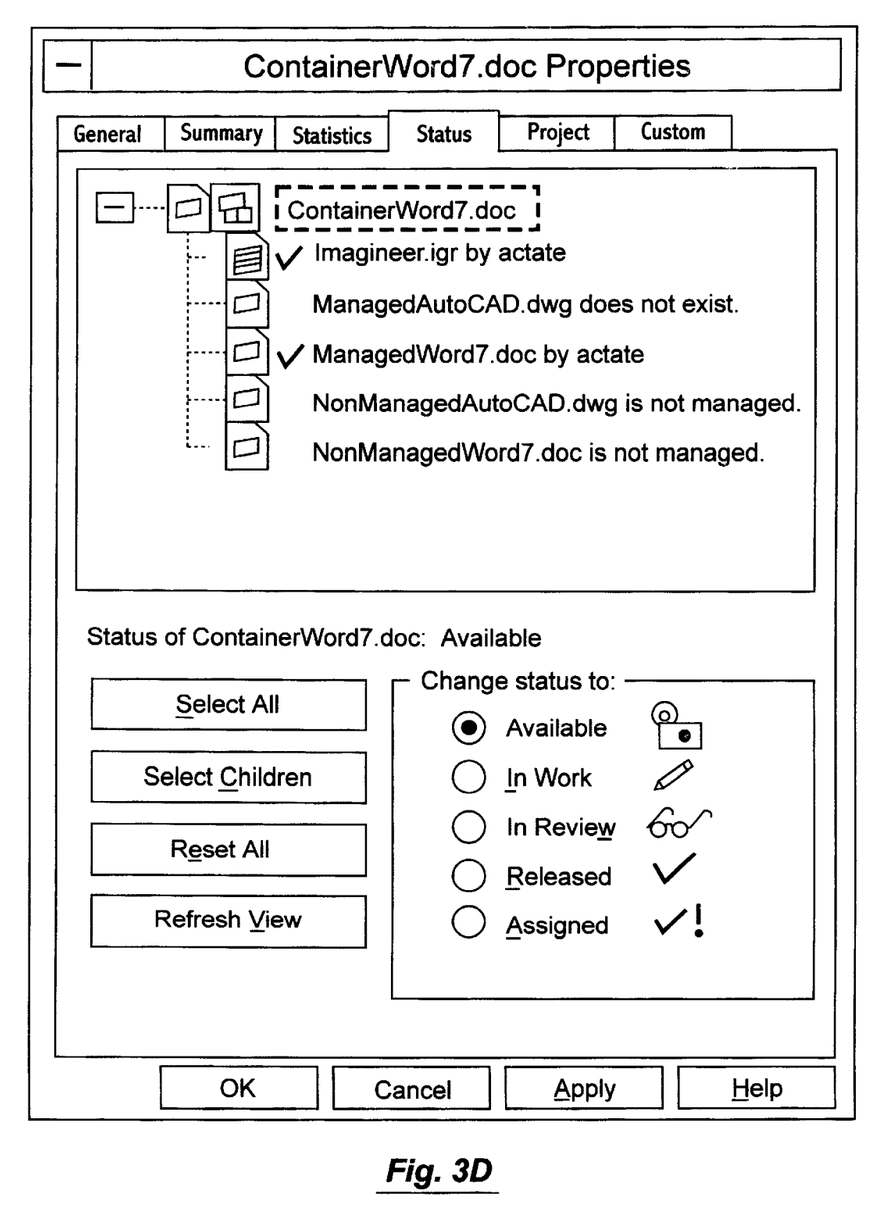

FIG. 3D depicts a status page which shows the state of the managed document. For example, the document may be available, in work, in review, released or baselined. A variety of other states of a managed document also may be used within the scope of the present invention. For example, the above-noted file states may be used for document management software so that multiple users working on a common network or intranet can see the status of the document. This may be desired, for example, to prevent two users from simultaneously revising the same document.

Figure 3E:
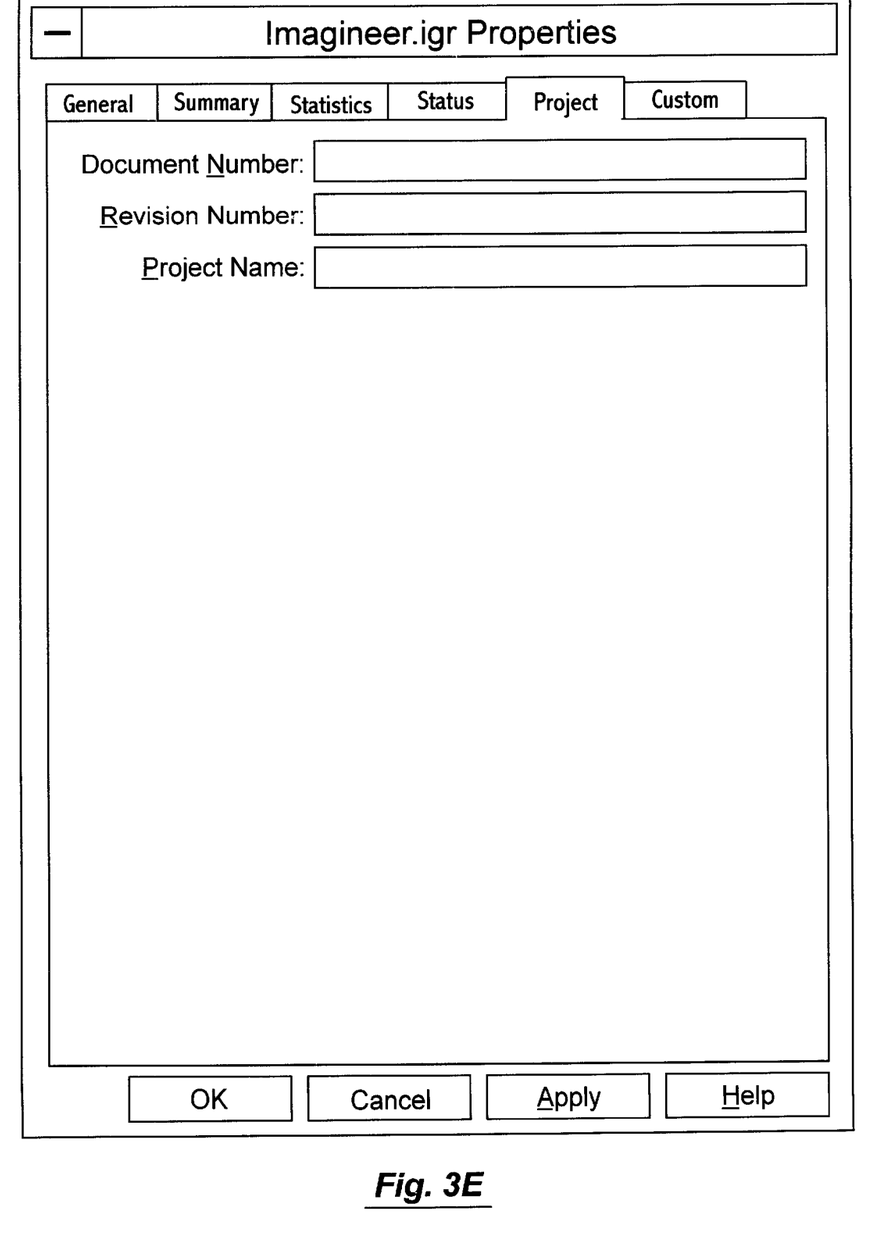

FIG. 3E depicts an exemplary project page for a managed document. The project page shows the document number, revision number and project name properties for the managed document. Again, these properties may be edited by the user. The editing of these and any other properties results in the modification of the properties contained within the managed document and/or the properties stored in the linked shadow file corresponding to that managed document.

Figure 3F:
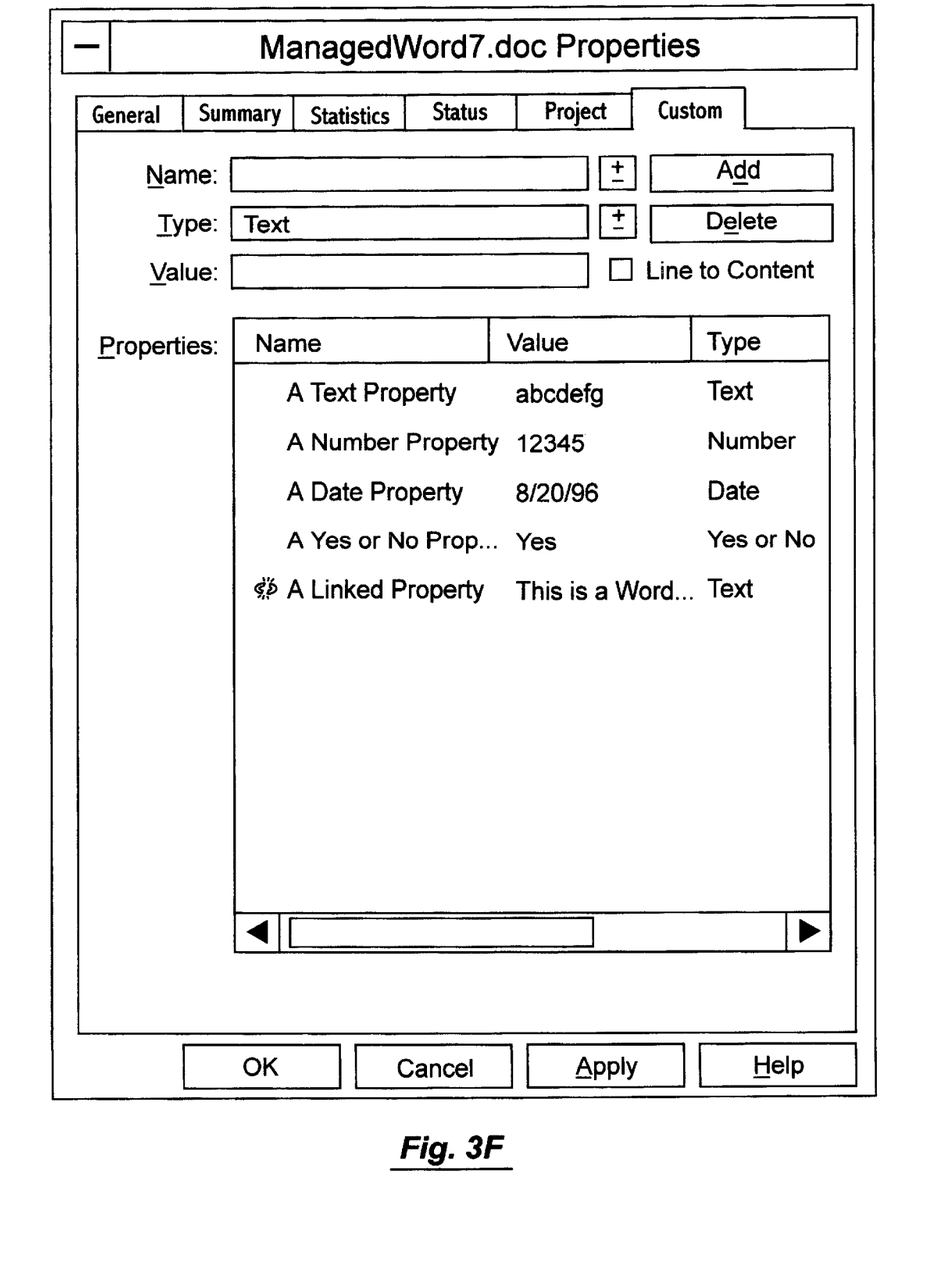

The display depicted in FIG. 3F supports the creation and modification of custom file properties associated with the managed document. In this manner, a particular file may have additional document properties as specified by a user in addition to the desired properties common to all managed documents.

By providing file indexer software which examines the managed documents or computer files residing on a managed directory, a uniform set of desired properties may be associated with each managed document. This is particularly advantageous when a managed directory contains computer files to be managed which have been created by a number of different types of applications, thereby producing a number of different types of computer files each containing different, if any, file properties.

The invention has now been described in detail. However, it will be appreciated that certain changes and modifications may be made. Therefore, the scope and content of this invention are not limited by the foregoing description. Rather, the scope and content are to be defined by the following claims.

What is claimed is:

1. A computer system for managing computer files, the computer system comprising:
   a processor;
   a display coupled to said processor; and
   a computer readable storage media coupled to said processor comprising:
   code that directs said processor to retrieve a first computer file from said storage media;
   code that directs said processor to examine said first computer file to determine if a plurality of desired properties are contained within said first computer file;
   code that directs said processor to create a first shadow file if all of said plurality of desired properties are not contained within said first computer file;
   code that directs said processor to input a default value into said first shadow file for at least one of said plurality of desired properties that are not contained within said first computer file; and
   code that directs said processor to link said first shadow file with said first computer file.

2. A computer system as in claim 1, said computer readable storage media further comprising code that directs said processor to copy said first shadow file each time said first computer file is copied.

3. A computer system as in claim 1, said computer readable storage media further comprising code that directs said processor to display at least one of said plurality of desired properties on said display.

4. A method for managing computer files contained on a computer system, said method comprising:
   creating a managed directory on said computer system, said managed directory comprising a plurality of computer files;
   examining a first computer file of said plurality of computer files to determine if a plurality of desired properties are contained within said first computer file;
   if said first computer file does not contain all of said plurality of desired properties, creating a first shadow file, and linking said first shadow file with said first computer file; and
   inputting a default value into said first shadow file for at least one of said plurality of desired properties not contained within said first computer file.

5. A method as in claim 4, further comprising copying said first computer file to create a second computer file, said copying step causing said first shadow file to be copied to create a second shadow file that is linked with said second computer file.

6. A method as in claim 4, further comprising copying said first computer file to a second managed directory, said copying step causing said first shadow file to be copied to said second managed directory, said first computer file on said second managed directory linked with said first shadow file on said second managed directory.

7. A method as in claim 4, wherein said examining step is performed for each of said plurality of computer files within said managed directory and said creating, inputting and linking steps are performed for each of said plurality of computer files that does not contain all of said plurality of desired properties.

8. A method as in claim 4, wherein said examining step is performed for each of said plurality of computer files within said managed directory, and further comprising linking each of said Plurality of computer files that does not contain all of said plurality of desired properties to said first shadow file.

9. A method as in claim 4, wherein said creating a managed directory steps creates said managed directory to comprise a plurality of subdirectories, and wherein said creating said first shadow file step creates said first shadow file in the same subdirectory as said first computer file.

10. A method as in claim 9, wherein each subdirectory has an associated shadow file, said associated shadow file being linked with all of said plurality of computer files that are in said subdirectory that do not contain all of said plurality of desired properties.

11. A method as in claim 7, wherein said creating steps create a plurality of shadow files.

12. A method as in claim 11, further comprising searching said plurality of computer files and said plurality of shadow files for a first desired property.

13. A method as in claim 4, wherein said plurality of desired properties comprise at least one property selected from a group of properties consisting essentially of a file title, a file subject, a file author, and a file keyword.

14. A method as in claim 4, wherein said plurality of desired properties comprise at least one property selected from a group of properties consisting essentially of a file number, a revision number, and a file date.

15. A method as in claim 4, further comprising displaying at least one of said plurality of desired properties on a computer display.

16. An article of manufacture, comprising:
   a computer usable medium having a computer readable program code means embodied therein for causing a computer to verify the existence of computer file properties, the computer readable program code means in said article of manufacture comprising:

code for causing said computer to examine a first computer file to determine if said first computer file contains a plurality of desired properties;

code for causing said computer to create a first shadow file if said first computer file does not contain all of said plurality of desired properties;

code for causing said computer to link said first shadow file with said first computer file; and code for causing said computer to input a default value into said first shadow file for at least one of said plurality of desired properties not contained in said first computer file.

17. A method for managing computer files contained on a computer system, said method comprising:

creating a managed directory on said computer system, said managed directory comprising a plurality of computer files;

examining a first computer file of said plurality of computer files to determine if a plurality of desired properties are contained within said first computer file; and if said first computer file does not contain all of said plurality of desired properties, inputting a default value into said first computer file for at least one of said plurality of desired properties not contained within said first computer file.

18. A method for managing computer files contained on a computer system, the method comprising:

creating a managed directory on the computer system, the managed directory comprising a plurality of computer files;

examining each of the plurality of computer files to determine if a plurality of desired properties are contained in each of the computer files;

if at least one of the plurality of computer files does not contain all of the plurality of desired properties, creating a first shadow file, and linking the first shadow file with the at least one computer file; and inputting a default value into the first shadow file for at least one of the plurality of desired properties not contained within the at least one computer file.

19. The method as in claim 18 further comprising linking each of the plurality of computer files that does not contain all of the plurality of desired properties to the first shadow file.

20. The method as in claim 18 further comprising inputting a default value into the first shadow file for each of the desired properties not contained within the at least one computer file.

21. The method as in claim 18 further comprising, for each of the plurality of computer files, inputting a default value into the first shadow file for each of the desired properties not contained within the computer file.

22. The method as in claim 18 wherein the plurality of desired properties comprise at least one property selected from a group of properties consisting essentially of a file title, a file subject, a file author, and a file keyword.

23. A method as in claim 18 wherein the plurality of desired properties comprise at least one property selected from a group of properties consisting essentially of a file number, a revision number, and a file date.

* * * * *